(12) United States Patent
Kwon

(10) Patent No.: US 10,713,580 B2
(45) Date of Patent: Jul. 14, 2020

(54) FAILURE PREDICTION APPARATUS FOR ELECTRIC DEVICE AND FAILURE PREDICTION METHOD USING THE SAME

(71) Applicant: UNIST(ULSAN NATIONAL INSTITUTE OF SCIENCE AND TECHNOLOGY), Ulsan (KR)

(72) Inventor: Dae Il Kwon, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 829 days.

(21) Appl. No.: 15/401,097

(22) Filed: Jan. 9, 2017

(65) Prior Publication Data

US 2017/0206459 A1 Jul. 20, 2017

(30) Foreign Application Priority Data

Jan. 20, 2016 (KR) ........................ 10-2016-0007009

(51) Int. Cl.
*G06N 7/00* (2006.01)
*G06F 17/16* (2006.01)
*G06F 11/00* (2006.01)

(52) U.S. Cl.
CPC ............ *G06N 7/005* (2013.01); *G06F 11/00* (2013.01)

(58) Field of Classification Search
CPC ................................. G01N 7/005; G06F 17/16
USPC ..................... 702/181, 185; 700/261; 714/25
See application file for complete search history.

(56) References Cited

U.S. PATENT DOCUMENTS

| 7,216,062 B1* | 5/2007 | Vacar ................... G06F 11/008 702/185 |
| 2003/0014692 A1* | 1/2003 | James ................... G05B 17/02 714/25 |
| 2003/0046026 A1* | 3/2003 | Levy ................... G06F 11/008 702/181 |
| 2015/0328774 A1* | 11/2015 | Yajima ................... B25J 9/1674 700/261 |

FOREIGN PATENT DOCUMENTS

KR 10-1208091 B1 12/2012

* cited by examiner

*Primary Examiner* — John H Le
(74) *Attorney, Agent, or Firm* — Revolution IP, PLLC

(57) ABSTRACT

Provided is a failure prediction method using a failure prediction apparatus, including: receiving time-series data about measured performance parameters from a device under test; encoding the time-series data with a plurality of symbols corresponding to a predetermined range; calculating a transition probabilities between the symbols of the encoded time-series data, and generating a transition matrix according to the transition probabilities; calculating an abnormal indicator, which is a difference between the transition matrix and a pre-stored database, and an increased value of the abnormal indicator; and comparing the increased value of the abnormal indicator and a predetermined threshold value, and if the increased value of the abnormal indicator is greater than the predetermined threshold value, predicting that failure of the device under test is to occur.

6 Claims, 4 Drawing Sheets

[FIG. 1]
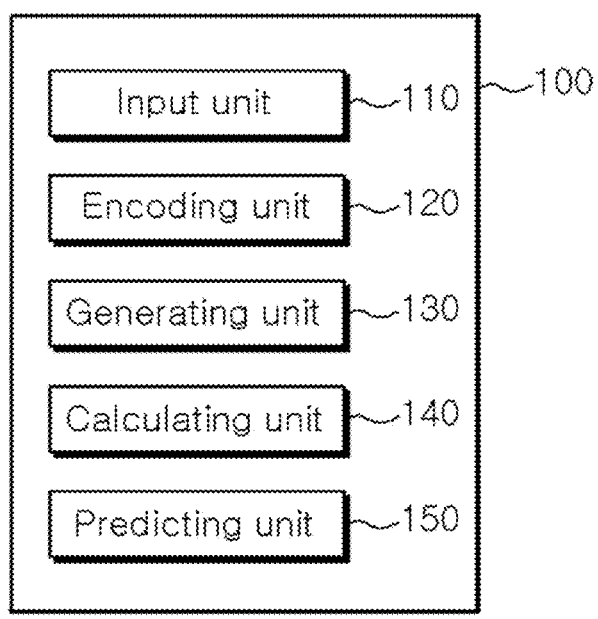

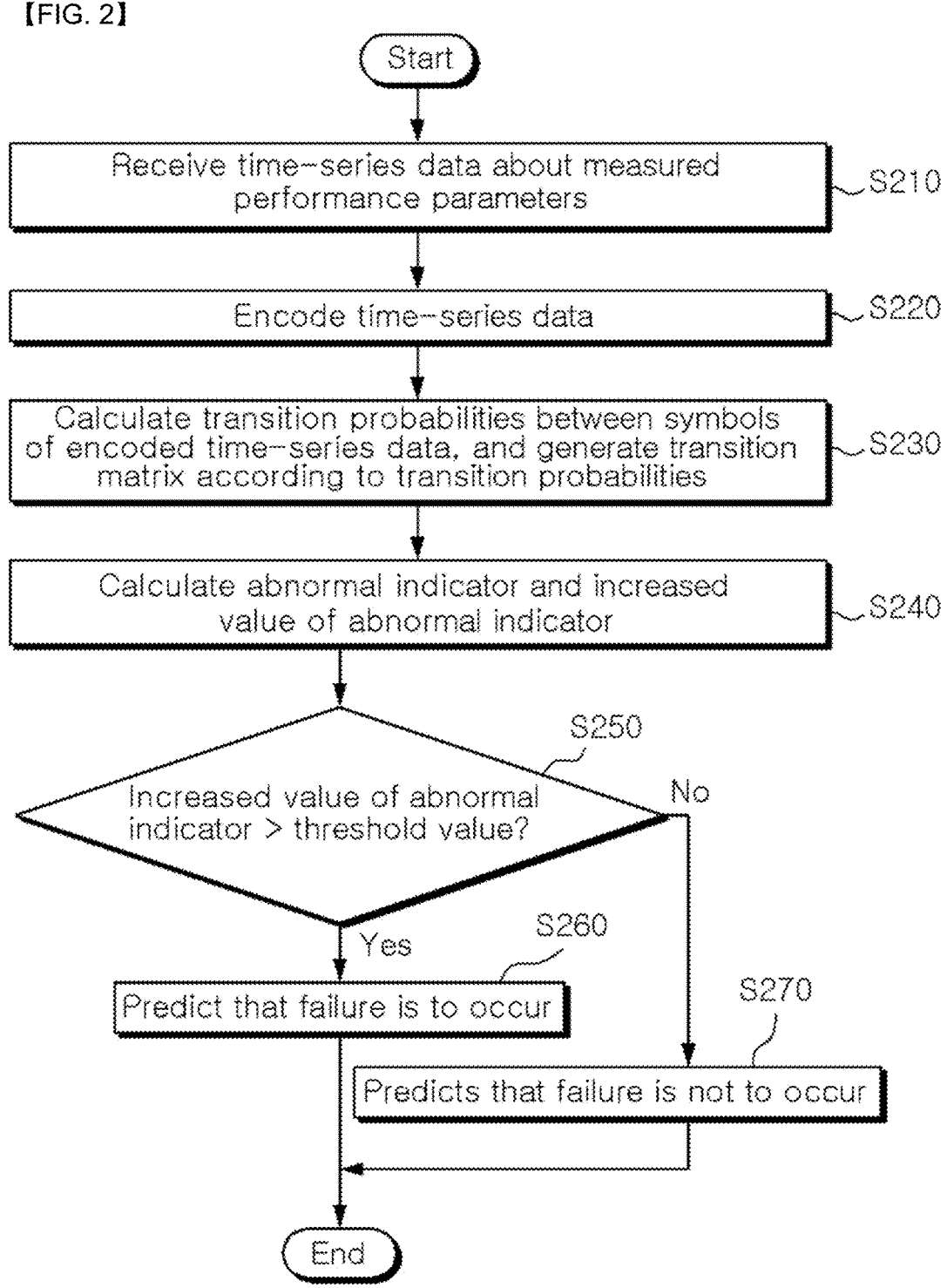

[FIG. 3]
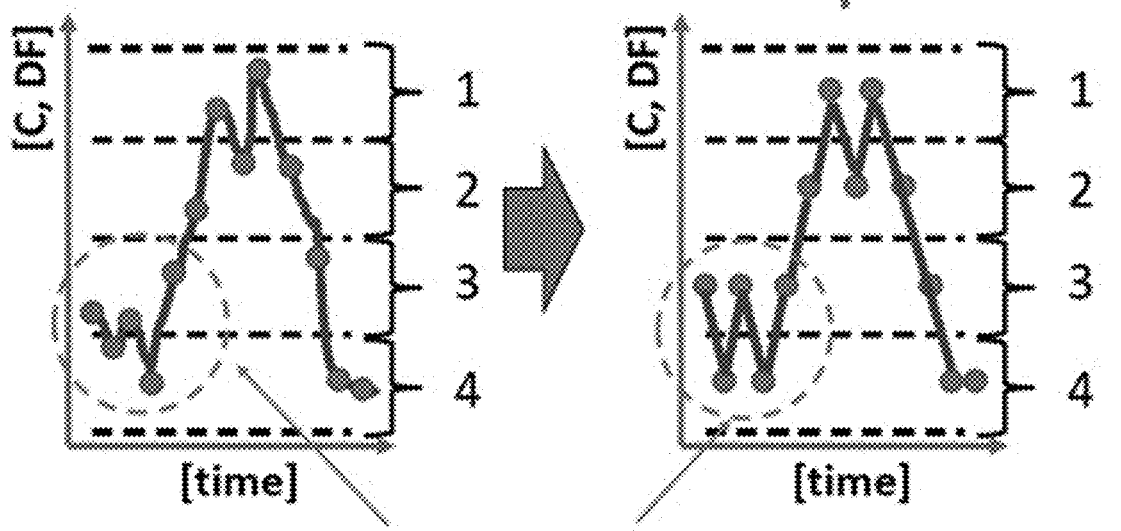
[FIG. 4]
$$\begin{bmatrix} P_{11} & \cdots & P_{14} \\ \vdots & \ddots & \vdots \\ P_{41} & \cdots & P_{44} \end{bmatrix}$$
Calculate the transition probability, $P_{ij}$
($i$: current symbol, $j$: next symbol)

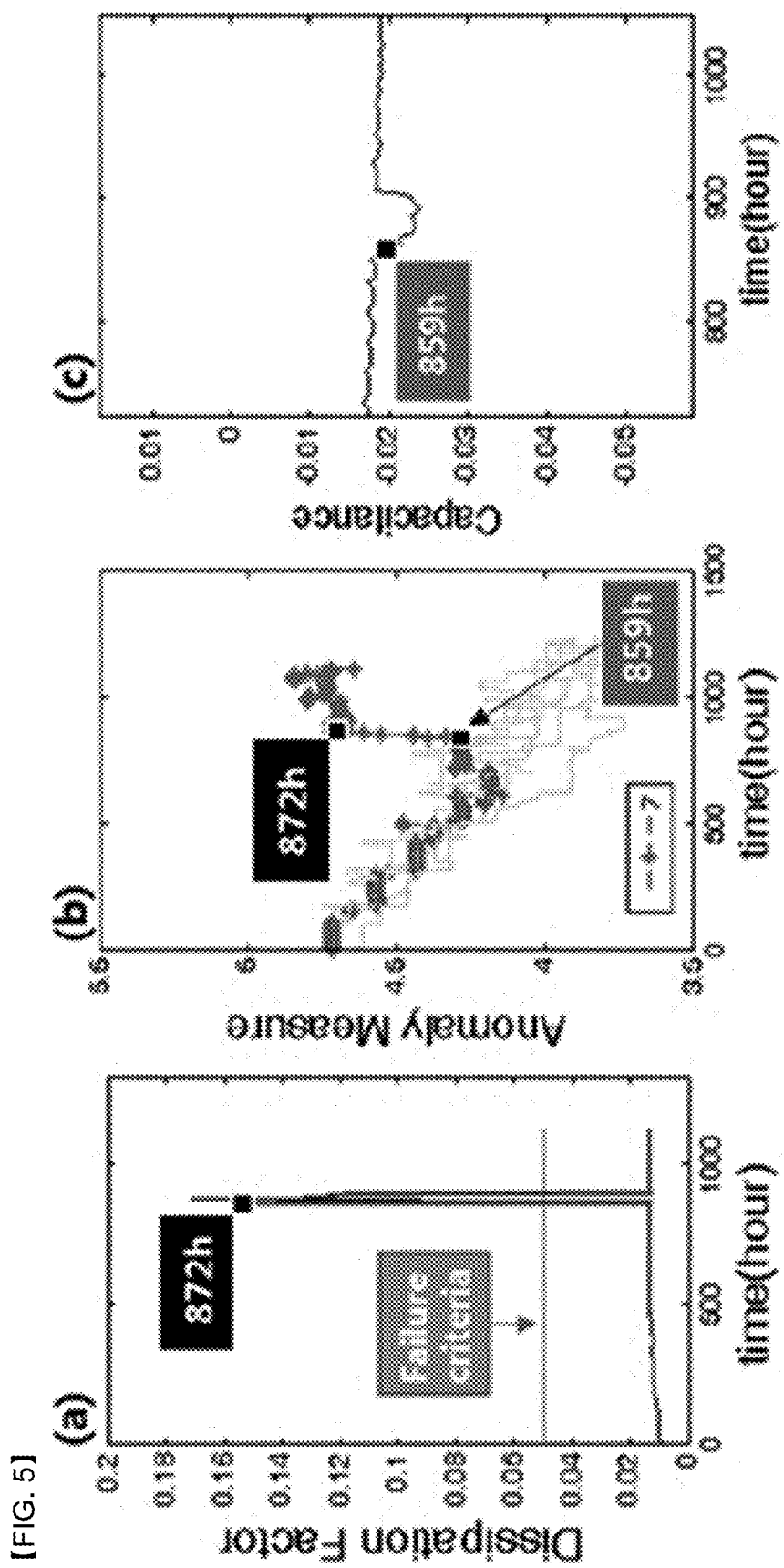
[FIG. 5]

FAILURE PREDICTION APPARATUS FOR ELECTRIC DEVICE AND FAILURE PREDICTION METHOD USING THE SAME

CROSS-REFERENCE TO RELATED APPLICATION

This application claims priority to and the benefit of Korean Patent Application No. 10-2016-0007009 filed in the Korean Intellectual Property Office on Jan. 20, 2016, the entire contents of which are incorporated herein by reference.

BACKGROUND OF THE DISCLOSURE

1. Field of the Disclosure

The present invention relates to a failure prediction apparatus for an electronic device and a failure prediction method using the same, and more particularly, to a failure prediction apparatus for an electronic device and a failure prediction method using the same for predicting failure occurrence of the electronic device by analyzing measured data about performance parameters of the electronic device under test.

2. Description of the Related Art

Failure prediction of a system refers to a process of predicting the time when failure of the system is to occur by evaluating a degree of degradation of the system in operation. Such failure prediction of the system plays a significant role in preventing property loss or human loss resulting from sudden failure in advance.

Therefore, industry-wide researches on a system of predicting and diagnosing failures of systems or devices are now in progress to minimize property or human loss, and such a system is actually applied to some fields of industries.

However, most of failure prediction methods take physical analysis of each system model or each device model, or its theoretical background into account, so they have a narrow field of application, and have a problem in that the entire failure prediction system should be modified so as to apply the methods to other system models.

In addition, since high-priced measuring equipment or computing equipment which should perform an enormous amount of computing operations is required, the methods are primarily applied to a failure diagnosis process for high-priced systems.

The background art of the present invention is disclosed in Korean Patent No. 10-1208091(published on Dec. 4, 2012).

SUMMARY OF THE DISCLOSURE

The present invention has been made in an effort to provide a failure prediction apparatus for an electronic device under test and a failure prediction method using the same for predicting failure occurrence of the electronic device by analyzing measurement data on performance parameters of the corresponding electronic device.

An exemplary embodiment of the present invention provides a failure prediction method using a failure prediction apparatus including: receiving time-series data about measured performance parameters from a device under test; encoding the time-series data with a plurality of symbols corresponding to a predetermined range; calculating a transition probabilities between the symbols of the encoded time-series data, and generating a transition matrix according to the transition probabilities; calculating an abnormal indicator, which is a difference between the transition matrix and a pre-stored database, and an increased value of the abnormal indicator; and comparing the increased value of the abnormal indicator and a predetermined threshold value, and if the increased value of the abnormal indicator is greater than the predetermined threshold value, predicting that failure of the device under test is to occur.

The database may be generated by encoding the time-series data about the performance parameters measured when the device under test is normally operated, and forming a transition matrix of the transition probabilities between the respective symbols.

The calculating of the abnormal indicator and the increased value of the abnormal indicator may include calculating, using a matrix norm, the abnormal indicator, which is the difference between the transition matrix and the pre-stored database.

The increased value of the abnormal indicator may include at least one of an instantaneous slope of the abnormal indicator and the number of continuous times the abnormal indicator is increased.

The calculating of the abnormal indicator and the increased value of the abnormal indicator may include calculating the instantaneous slope of the abnormal indicator using the least square method.

Another exemplary embodiment of the present invention provides a failure prediction apparatus including: an input unit configured to receive time-series data about measured performance parameters from a device under test; an encoding unit configured to encode the time-series data with a plurality of symbols corresponding to a predetermined range; a generating unit configured to calculate transition probabilities between the symbols of the encoded time-series data and generate a transition matrix according to the transition probabilities; a calculating unit configured to calculate an abnormal indicator, which is a difference between the transition matrix and a pre-stored database, and an increased value of the abnormal indicator; and a predicting unit configured to compare the increased value of the abnormal indicator and a predetermined threshold value, and if the increased value of the abnormal indicator is greater than the predetermined threshold value, predict that failure of the device under test is to occur.

As described above, according to the present invention, signs of the failure of the device under test or the system can be accurately predicted in advance by using only the measured data even without physical analysis or theoretical background of the device under test and the system. In addition, by using the encoded data, the amount of calculation required for predicting the signs of the failure can be reduced, thereby predicting the signs of the failure in advance even without using the high-priced computing equipment or the like.

BRIEF DESCRIPTION OF THE DRAWINGS

FIG. 1 is a schematic diagram of a failure prediction apparatus according to an exemplary embodiment of the present invention.

FIG. 2 is a flowchart of a failure prediction method according to an exemplary embodiment of the present invention.

FIG. 3 illustrates an encoding method according to an exemplary embodiment of the present invention.

FIG. 4 illustrates a transition matrix according to an exemplary embodiment of the present invention.

FIG. 5 illustrates simulation results of failure prediction according to an exemplary embodiment of the present invention.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

The present invention will be described more fully hereinafter with reference to the accompanying drawings, in which exemplary embodiments of the invention are shown.

First, referring to FIG. 1, a configuration of a failure prediction apparatus 100 according to an exemplary embodiment of the present invention will be described. FIG. 1 is a schematic diagram of a failure prediction apparatus according to an exemplary embodiment of the present invention.

As shown in FIG. 1, the failure prediction apparatus 100 includes an input unit 110, an encoding unit 120, a generating unit 130, a calculating unit 140, and a predicting unit 150.

First, the input unit 110 receives time-series data for measured performance parameters from a device under test. In this case, the time-series data about the parameters of the device under test may be measured from the device under test by a sensor or measuring device, and the input unit 110 may receive the time-series data transmitted from the sensor or the like which is in wired or wireless communication with the device under test.

In this case, the device under test may be an electronic device or an electronic component, and may include not only a specific apparatus or device but also a control system or the like using a device or apparatus.

Then, encoder 120 encodes the time-series data with a plurality of symbols corresponding to a predetermined range.

The generator 130 calculates transition probabilities between the symbols of the encoded time-series data, and generates a transition matrix according to the transition probabilities.

Next, the calculating unit 140 calculates a difference between the transition matrix and an abnormal indicator, which is a pre-stored database, and an increased value of the abnormal indicator. In this case, the database may be generated by encoding the time-series data about the performance parameters measured when the device under test is normally operated, and then forming the transition matrix of the transition probabilities between the respective symbols.

In addition, the calculating unit 140 may calculate, using a matrix norm, the difference between the transition matrix and the pre-stored database. In this case, the difference becomes the abnormal indicator.

On the other hand, the increased value of the abnormal indicator may include at least one of an instantaneous slope of the abnormal indicator and the number of times the abnormal indicator is continuously increased, and the instantaneous slope of the abnormal indicator may be calculated using the least square method.

Then, the predicting unit 150 compares the increased value of the abnormal indicator with a predetermined threshold value. After the comparison, if the increased value of the abnormal indicator is greater than the predetermined threshold value, it is predicted that failure of the device under test is to occur.

On the contrary, if the increased value of the abnormal indicator is equal to or less than the predetermined threshold value, the predicting unit 150 may determine that failure of the device under test is not to occur.

Next, referring to FIGS. 2 to 4, a failure prediction method using a failure prediction apparatus 100 according to an exemplary embodiment of the present invention will be described. FIG. 2 is a flowchart of a failure prediction method according to an exemplary embodiment of the present invention.

First, the failure prediction apparatus 100 receives time-series data about measured performance parameters from a device under test (S210).

In this case, the time-series data means data in which measured values of specific performance parameters of the device under test are represented in a time domain, and the performance parameters means the parameters that represents performance of the device under test. For example, if the device under test is a multi-layer ceramic capacitor, it can receive capacitance or a value measured in a time domain for the dissipation factor from the parameters of the multi-layer ceramic capacitor.

In addition, the time-series data may be measured at a regular time interval (e.g., 10 min. interval) on the time axis.

Meanwhile, there may be one or more of performance parameters of the device under test, and may be changed by the device under test, kinds of the systems, or the like, the design of the parameters may be changed by those skilled in the art.

Next, the failure prediction apparatus 100 encodes the time-series data with a plurality of symbols corresponding to a predetermined range (S220).

In this case, the time-series data in which the parameters of the device under test are measured may have various values, and if these measured values are used without being processed, there is a problem in that a large amount of data should be processed. Therefore, in the step S220, as a means for solving such a problem, the time-series data is encoded.

Specifically, the plurality of symbols are encoded by matching the measured values of the time-series data to the predetermined data range. In this case, the predetermined data range may be set in consideration of an overall range of the data measured when the device under test is in a normal operating condition, and the data range may be differently designed by those skilled in the art.

Meanwhile, if there are a plurality of measured performance parameters of the device under test, the time-series data may also be encoded using a combination of symbols for each parameter.

FIG. 3 illustrates an encoding method according to an exemplary embodiment of the present invention, and a left graph of FIG. 3 is a graph of time-series data in a time domain showing that various values are being measured according to time.

If the time-series data is matched to ranges identified by 1 to 4, it can be represented by a graph like a right side of FIG. 3, and if encoded, the time-series data may be represented by " . . . 3434321212344 . . . ".

Next, the failure prediction apparatus 100 calculates transition probabilities between the symbols of the encoded time-series data, and generates a transition matrix according to the transition probabilities (S230).

Specifically, the transition probabilities between the symbols are continuously updated as the time-series data changes over time, and may be calculated and updated at every measurement point when the time-series data measured at a regular time interval are encoded.

For example, prior to the current measurement point, suppose a probability of transitioning from symbol 3 to symbol 4 is 65% and the current measurement data is data when symbol 3 is transitioned to symbol 4, the failure prediction apparatus 100 may update the probability of transitioning from symbol 3 to symbol 4 to 67% by reflecting the current measurement data, and accordingly, a probability of the transition of symbol 3 to symbols 1 to 3 may also be updated.

In addition, the failure prediction apparatus 100 calculates a transition matrix according to the transition probabilities, and in this case, the transition matrix may be represented as that shown in FIG. 4. FIG. 4 illustrates a transition matrix according to an exemplary embodiment of the present invention.

As shown in FIG. 4, the transition matrix may be generated by forming a matrix of a probability ($P_{ij}$) of transitioning the current symbol (i) to the next symbol (j), i.e., transition probabilities, and FIG. 4 represents a transition matrix with 4 symbols. A size of the transition matrix may be dependent upon the number of symbols.

After generating the transition matrix in the step S230, the failure prediction apparatus 100 calculates a difference between the transition matrix and a pre-stored database, which is an abnormal indicator, and an increased value of the abnormal indicator is calculated using the calculated abnormal indicator (S240).

In this case, a database may be generated by encoding time-series data about performance parameters measured when a device under test is normally operated, and by forming a transition matrix of the transition probabilities between the respective symbols. In this case, since the method of generating the database is the same as the steps S210 to S230, a detailed description will be omitted.

On the other hand, the abnormal indicator means an indicator indicating how much the currently measured time-series data differs from the time-series data measured when the device is normally operated, and the failure prediction apparatus 100 may calculate the abnormal indicator by calculating a difference between the transition matrix generated in the step S230 and the database.

Specifically, the failure prediction apparatus 100 may calculate, using a matrix norm, the difference between the transition matrix and the pre-stored database, which is the abnormal indicator, and a detailed description will be omitted since a process of calculation using the matrix norm is apparent to those skilled in the art.

In addition, the failure prediction apparatus 100 calculates the increased value of the abnormal indicator by using the calculated abnormal indicator, and the increased value of the abnormal indicator includes at least one of an instantaneous slope of the abnormal indicator and the number of times the abnormal indicator is continuously increased.

In this case, the instantaneous slope of the abnormal indicator is calculated using the current abnormal indicator value and the previous abnormal indicator value, but in this case, there may be a range where they are temporarily or locally decreased. In order to improve accuracy of failure prediction by reducing such singularity, the failure prediction apparatus 100 may calculate the instantaneous slope of the abnormal indicator by linearly fitting two or more of the previous abnormal indicator values and the current abnormal indicator value.

For example, assuming that the current time is T4, the instantaneous slope of the abnormal indicator at T4 may be calculated by linearly fitting the abnormal indicator value at T3 to T1 and the abnormal indicator value at T4.

On the other hand, the failure prediction apparatus 100 may calculate the instantaneous slope of the abnormal indicator by using the least square method. The least square method is a method of processing measured results by making an appropriate sum of squares based on measured values such that the sum is minimized, and is also referred to as the method of least squares. Since the process of calculating the instantaneous slope by the least square method is apparent to those skilled in the art, a detailed description will be omitted.

After calculating the increased value of the abnormal indicator in the step S240, the failure prediction apparatus 100 compares the increased value of the abnormal indicator with a predetermined threshold value (S250). In this case, the predetermined threshold value may be set in consideration of the case in which the device under test is normally operated, and the design of the threshold values may be changed by those skilled in the art depending on kinds of the device under test or measured parameters.

On the other hand, since the increased value of the abnormal indicator includes at least one of the instantaneous slope of the abnormal indicator and the number of times the abnormal indicator is continuously increased, the failure prediction apparatus 100 may not only compare the instantaneous slope of the abnormal indicator or the number of times the abnormal indicator is continuously increased with threshold values corresponding to each of them, but may also compare both of the instantaneous slope and the number of times the abnormal indicator is continuously increased with the respective threshold values.

After the comparison in the step S250, if the increased value of the abnormal indicator is greater than the predetermined threshold value, the failure prediction apparatus 100 predicts that failure of the device under test is to occur (S260).

On the other hand, if the increased value of the abnormal indicator includes both of the instantaneous slope of the abnormal indicator and the number of times the abnormal indicator is continuously increased, the failure prediction apparatus 100 may predict that failure is to occur if both of the instantaneous slope of the abnormal indicator and the number of times the abnormal indicator is continuously increased are greater than the respective threshold values.

On the contrary, after the comparison in the step S250, if the increased value of the abnormal indicator is less than or equal to the predetermined threshold value, the failure prediction apparatus 100 predicts that failure of the device under test is not to occur (S270).

The prediction results in the steps S260 and S270 may be provided to a user via a display device or an acoustic device included in the failure prediction apparatus 100, and may be provided to the user via a terminal which is in wired or wireless communication with the failure prediction apparatus 100.

Now, referring to FIG. 5, a simulation result of the present invention will be described. FIG. 5 illustrates a failure prediction simulation result according to an exemplary embodiment of the present invention.

FIG. 5 illustrates a simulation result of failure prediction for a multi-layer ceramic capacitor, and as shown in FIG. 5 (a), a dissipation factor of the multi-layer ceramic capacitor used in the simulation dramatically increases after 872 hours, which represents that failure of the multi-layer ceramic capacitor has occurred.

After analyzing data about a multi-layer ceramic capacitor in which no failure occurs, it is observed that the normal multi-layer ceramic capacitor has two abnormal increases of the abnormal indicator at maximum, and the instantaneous slope is in the range of 0.01 to 0.02. Accordingly, if the slope is higher than 0.01 when three or more consecutive positive slopes are measured, a failure alert is generated in the simulation.

After the simulation, in the failure prediction apparatus 100 according to the present invention, the slope of the abnormal indicator and the number of times abnormal indicator is continuously increased are measured such that they are higher than the threshold values after 859 hrs., and the failure of the corresponding multi-layer ceramic capacitor is detected 13 hrs. before the actual failure time.

FIG. 5 (c) is a comparison result of data about capacitance measured at failure prediction times, and it can be seen that there is minute fluctuation in capacitance at the failure prediction times. This means that even a failure precursor that does not correspond to the failure criterion can be detected by the present invention.

According to the exemplary embodiment of the present invention, signs of the failure of the device under test or the system can be accurately predicted in advance by using only the measured data even without physical analysis or theoretical background of the device under test and the system. In addition, by using the encoded data, the amount of calculation required for predicting the signs of the failure can be reduced, thereby predicting the signs of the failure in advance even without using the high-priced computing equipment or the like.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Consequently, the true technical protective scope of the present invention must be determined based on the technical spirit of the appended claims.

DESCRIPTION OF SYMBOLS

| | |
|---|---|
| 100: failure prediction apparatus | 110: input unit |
| 120: encoding unit | 130: generating unit |
| 140: calculating unit | 150: predicting unit |

What is claimed is:

1. A failure prediction method using a failure prediction apparatus, comprising:
    receiving time-series data about measured performance parameters from a device under test;
    encoding the time-series data with a plurality of symbols corresponding to a predetermined range;
    calculating a transition probabilities between the symbols of the encoded time-series data, and generating a transition matrix according to the transition probabilities;
    calculating an abnormal indicator, which is a difference between the transition matrix and a pre-stored database, and an increased value of the abnormal indicator,
    wherein a matrix norm is used for the calculating the abnormal indicator, which is the difference between the transition matrix and the pre-stored database,
    wherein the increased value of the abnormal indicator includes at least one of an instantaneous slope of the abnormal indicator and the number of continuous times the abnormal indicator being increased; and
    comparing the increased value of the abnormal indicator and a predetermined threshold value, and if the increased value of the abnormal indicator is greater than the predetermined threshold value, predicting that failure of the device under test is to occur.

2. The method of claim 1, wherein the pre-stored database is generated by encoding the time-series data about the performance parameters measured when the device under test is normally operated, and forming the transition matrix of the transition probabilities between the respective symbols.

3. The method of claim 1, wherein the calculating of the abnormal indicator and the increased value of the abnormal indicator includes calculating the instantaneous slope of the abnormal indicator using the least square method.

4. A failure prediction apparatus, comprising:
    an input unit configured to receive time-series data about measured performance parameters from a device under test;
    an encoding unit configured to encode the time-series data with a plurality of symbols corresponding to a predetermined range;
    a generating unit configured to calculate transition probabilities between the symbols of the encoded time-series data and generate a transition matrix according to the transition probabilities;
    a calculating unit configured to calculate an abnormal indicator, which is a difference between the transition matrix and a pre-stored database, and an increased value of the abnormal indicator,
    wherein the calculating unit is configured to calculate the abnormal indicator, which is the difference between the transition matrix and the pre-stored database, using a matrix norm,
    wherein the increased value of the abnormal indicator includes at least one of an instantaneous slope of the abnormal indicator and the number of continuous times the abnormal indicator being increased; and
    a predicting unit configured to compare the increased value of the abnormal indicator and a predetermined threshold value, and if the increased value of the abnormal indicator is greater than the predetermined threshold value, predict that failure of the device under test is to occur.

5. The apparatus of claim 4, wherein the pre-stored database is generated by encoding the time-series data about the performance parameters measured when the device under test is normally operated, and forming the transition matrix of the transition probabilities between the respective symbols.

6. The apparatus of claim 4, wherein the calculating unit is configured to calculate the instantaneous slope of the abnormal indicator using the least square method.

* * * * *